United States Patent
Ooten

(10) Patent No.: US 6,637,147 B2
(45) Date of Patent: Oct. 28, 2003

(54) HOOK SPINNING FISHING BAIT

(76) Inventor: Dorothy Marie Ooten, 2271 Bethel Hygiene Rd., Bethel, OH (US) 45106

( * ) Notice: Subject to any disclaimer, the term of this patent is extended or adjusted under 35 U.S.C. 154(b) by 0 days.

(21) Appl. No.: 10/090,587

(22) Filed: Mar. 4, 2002

(65) Prior Publication Data

US 2003/0163944 A1 Sep. 4, 2003

(51) Int. Cl.[7] .............................................. A01K 85/00
(52) U.S. Cl. ................................. 43/42.19; 43/42.17
(58) Field of Search .............................. 43/42.19, 42.17, 43/42.2, 42.37, 42.38, 42.43, 42.29, 42.3, 42.41

(56) References Cited

U.S. PATENT DOCUMENTS

| | | | | |
|---|---|---|---|---|
| 1,258,213 A | * | 3/1918 | Grothkopf | 43/42.17 |
| 1,265,900 A | * | 5/1918 | Foss | 43/42.17 |
| 1,450,777 A | * | 4/1923 | Hummell | 43/42.17 |
| 1,535,957 A | * | 4/1925 | Stanley et al. | 43/42.17 |
| 1,546,105 A | * | 7/1925 | Powell | 43/42.37 |
| 1,709,010 A | * | 4/1929 | Foss | 43/42.17 |
| 1,731,161 A | * | 10/1929 | Farley | 43/42.13 |
| 2,091,457 A | * | 8/1937 | Sauer | 43/42.06 |
| 2,163,378 A | * | 6/1939 | Horvath | 43/42.13 |
| 2,294,081 A | * | 8/1942 | Fairfax | 43/42.04 |
| 2,319,686 A | * | 5/1943 | Janischi | 43/42.43 |
| 2,380,328 A | * | 7/1945 | Pecher | 43/42.29 |
| 2,423,615 A | * | 7/1947 | Pecher | 43/42.29 |
| 2,590,167 A | * | 3/1952 | Fasano et al. | 43/42.4 |
| 2,635,381 A | * | 4/1953 | Coons | 43/42.1 |
| 3,020,668 A | * | 2/1962 | O'Neil | 43/42.16 |
| 3,260,012 A | * | 7/1966 | Stolzer | 43/42.1 |
| 3,640,014 A | * | 2/1972 | Gurka | 43/42.43 |
| 4,653,218 A | * | 3/1987 | Margulis | 43/26.2 |
| 4,771,568 A | * | 9/1988 | Head | 43/42.29 |
| 5,107,615 A | * | 4/1992 | Shaffer | 43/42.41 |
| 5,564,219 A | * | 10/1996 | Petri | 43/42.28 |

* cited by examiner

*Primary Examiner*—Peter M. Poon
*Assistant Examiner*—Joan M. Olszewski

(57) ABSTRACT

A hook spinning fishing bait comprising a pliable flat material, artificial or fresh, of an inverted tear-drop design having a vertical cut centered in the top portion of the inverted tear-drop design and one half the length of the inverted tear-drop design with two small holes one above the other in the bottom portion of the inverted tear-drop design for use as bait that can be attached directly to a fish hook forming a propeller like shape that spins the fish hook with the bait material when pulled through the water on a fishing line that is not permanently attached and is removable from the fish hook producing a bait of simple design that is interchangeable.

1 Claim, 2 Drawing Sheets

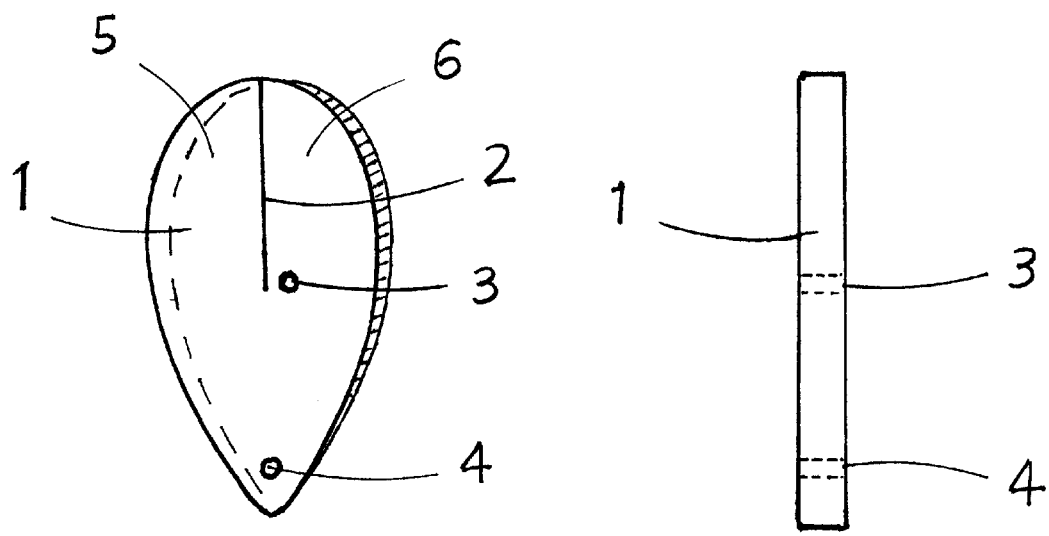
FIG 1   FIG 2
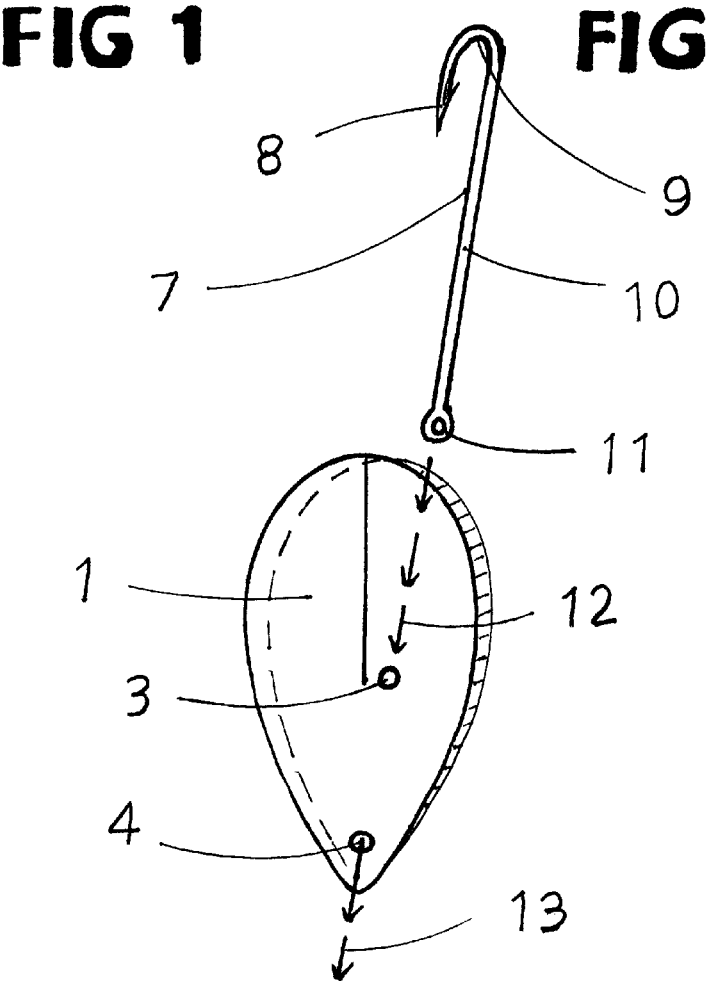
FIG 3

HOOK SPINNING FISHING BAIT

This invention relates to fishing bait, especially to fishing bait made from a pliable material, artificial or fresh, applied directly to a fishing hook, with means capable of spinning the fishing hook with the bait when pulled through a body of water causing a maximum attraction of the fish directly to the hook and enhancing the chances of catching fish, that is removable from the fish hook allowing the fisherman to change bait color, bait material, or hook style.

BACKGROUND—DESCRIPTION OF PRIOR ART

Over time a multiple of fishing baits, artificial or fresh, have been developed for attaching to a fisherman's fishing hook in an effort to catch fish. Color, scent, sound, and action can be determining factors in catching fish under a multiple of circumstances pertaining to climate and habitat. It is important for fisherman to have a variety of choice of bait for fishing different species of fish in different habitats. Many different forms of spinners or elaborate spiral action baits have evolved. The problem is to create a simple cost effective designed bait that can be applied to a multiple of fishing hooks already on the market today that can effectively cause action directly to the hook by spinning the hook with the bait through the water,thus turning the baited hook into an active lure. The many plastic worms and fish shapes or other styles of artificial bait do not have the design and capability of the invention stated here in.

The sonic plastic bait as referred to in U.S. Pat. No. 6,173,523 to Johnson in January 2001 shows a bait with appendages that vibrate or touch each other and produce a low sound when pulled through the water. These elaborate designed plastic baits can be expensive to make and do not afford the spinning action of the present invention.

The artificial bait of Henry's invention, U.S. Pat. No. 3,245,171, shows a helix that drops around the hook and spins when pulled through the water. This bait is made from a laminated material that can be expensive to make. The helix spins around the hook and does not spin the hook itself. Dirt can build up within the helix and cause the shape not to properly function around the hook.

U.S. Pat. No. 2,835,999 to Gillilan refers to a revolving fishing lure. The hooks are attached to two separate sections that rotate with each section. This type of lure is more likely to snag when fishing too close to the bottom.

The flexible body fishing lure of U.S. Pat. No. 5,412,901 has an elongated and deformable body that can be adjusted by changing the shape of the deformable lead body. This devise is designed for trolling. Twisting the body can cause a wobble or spiral action. The lure body is not directly connected to the hook. This lure needs a number of steps to assemble.

Many spinner fishing lures such as U.S. Pat. No. 4,881,341 of Dickey, have spinners that rotate about the axis of a shaft. This type of bait does not spin the hook itself and are less cost effective.

There are a multitude of designs and styles of bait on the market today. Through my searching and to my knowledge there are no hook spinning fishing baits of the design of the invention described herein made from a pliable material of an inverted tear-drop design, artificial or fresh, that can spin a fishing hook attached to a fisherman's fishing line when pulled through the water.

BRIEF SUMMARY OF THE INVENTION

The hook spinning fishing bait is a fishing bait made from a flat pliable material, fresh or artificial, cut or formed into an inverted tear-drop design of a predetermined size for use on a fishing hook that spins the fishing hook with the bait when pulled through the water on a fisherman's fishing line. The design of this invention has a vertical cut in the top portion of the inverted tear-drop designed material centered approximately one half the vertical length of the bait material with two small holes, one above the other at the end of the vertical cut for attaching to a fisherman's fishing hook. The top hole is slightly offset to the right of center. The hooks eye and shank passes through the top hole front to back and back through the bottom hole leaving the eye of the fishing hook stopped just below and in front of the bottom tip of the inverted tear-drop designed material, allowing for the attachment of the hook to the fisherman's fishing line, the hook not being permanently attached to the bait material allows for easy removal of the hook. The bend and barbed tip of the hook face forward away from the bait material allowing the top left quarter portion to bend forward and be attached to the barbed tip of the hook by pulling the tip of the left quarter portion of the inverted tear-drop design up into the pointed barbed tip of the hook. The right quarter portion of the bait material runs behind the top portion of the shank of the hook pushing the right quarter portion slightly backwards holding in place a propeller like shape on the hook that produces a spinning action of the hook with the bait by the force of the water against the propeller shaped bait material when pulled through the water on the fishing line.

The principal object of the present invention is to provide a substantially less expensive, effective fishing bait of a simple design made from different types of pliable material, artificial or fresh, for use on a fisherman's fishing hook that can spin a fish hook with the bait material causing a maximum attraction of the fish directly to the fish hook when pulled through the water on the fisherman's fishing line.

A further object of the present invention is to provide a bait that is not permanently attached to a fish hook allowing the fisherman the option to place a different color bait on that hook or place a different hook into the same bait making it interchangeable with fishing hooks commonly kept in the fisherman's tackle box and is easily stored by stacking the flat bait body in the tackle box ready to place on a chosen fish hook.

The advantages of the hook spinning fishing bait are the simplicity and effectiveness of the design allowing a fisherman choice of fresh or artificial bait, capable of spinning and adding action to a variety of fish hooks on the market and kept in most tackle boxes for fishing. The hook spinning fishing bait can be used on many style hooks including treble hooks. The design of the hook spinning bait when attached to the hook makes the hook less likely to snag in weeds.

Another advantage of the hook spinning fishing bait is being able to use a floatant material for making the design that will allow the hook to float off the bottom when used on a weighted fisherman's fishing line. This design is also excellent for the use in ice fishing where the diameter of the area fished is restricted and the play for the fish is a vertical play. The hook spinning fishing bait allows a maximum of action in a limited area. The hook spinning bait works well not only in a horizontal retrieval, but is also very effective in an up and down retrieving motion when used on a weighted fishing line.

BRIEF DESCRIPTION OF THE SEVERAL VIEWS OF THE DRAWING

FIG. 1 illustrates the die cut hook spinning bait material of the chosen example depicting the inverted tear-drop design showing the location of the vertical cut and the positioning of the two holes.

FIG. 2 illustrates the side view, showing the flatness of both front and back of the hook spinning bait material.

FIG. 3 illustrates an exploded perspective view showing the means for attaching the hook spinning bait material to a fish hook showing the direction the hook is inserted into the bait material.

REFERENCE NUMERALS IN DRAWINGS

Figure 4:
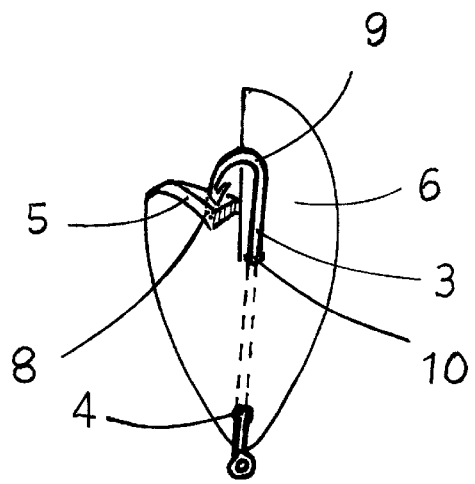
FIG. 4 illustrates a perspective view of the hook inserted into the hook spinning bait material showing the attachment of the barbed tip of hook to the top left quarter portion of the bait material. This view also shows the hook facing outward away from the bait material with the top right quarter portion pushed back behind the top of the shank of the hook just below the bend of the hook.

1. Flat inverted tear-drop shaped hook spinning bait material
2. Vertical center cut in top portion of hook spinning bait material
3. Top hole in hook spinning bait material
4. Bottom hole in hook spinning bait material
5. Top left quarter portion of hook spinning bait material
6. Top right quarter portion of hook spinning bait material
7. Fish hook
8. Barbed tip of fish hook
9. Bend of fish hook
10. Shaft of fish hook
11. Eye of fish hook
12. Arrow showing direction fish hook is passed through top hole in hook spinning bait material
13. Arrow showing direction fish hook passed through bottom hole in hook spinning bait material
14. Swivel attachment
15. Weight
16. Fishing line
17. Knot attaching fishing line to swivel assembly
18. Water line
19. Arrow showing directional movement of line toward fisherman
20. Arrow showing direction of water pushing against the back of the right quarter portion of the hook spinning bait material
21. Arrow showing direction of water pushing against the front of the top left quarter portion of the hook spinning bait material
22. Arrow showing the direction the hook and bait material spins when pulled through the water

DETAILED DESCRIPTION OF THE INVENTION

Referring now in detail to the drawings, the hook spinning fishing bait comprises, for this example, a flat pliable material die cut to an inverted tear-drop design as shown in REF. NUMERAL 1 of FIG. 1. The hook spinning bait material chosen for this example is made of cross-linked polyethylene foam, 1/16 inch thick, 1 and 1/2 inches at the longest vertical point, and 3/4 inch at the widest horizontal point with a vertical cut REF. NUMERAL 2 of FIG. 1 starting at the top center of the bait material approximately 3/4 inches long extending down and centered approximately one half the vertical length of the tear-drop design forming a left top quarter portion REF. NUMERAL 5 and a right top quarter portion REF. NUMERAL 6 of the inverted tear-drop design with two small holes REF. NUMERALS 3 and 4 one above the other in the bottom of the inverted tear-drop design as shown in FIG. 1. The top hole REF NUMERAL 3 is located slightly right of the bottom of the center vertical cut 3/4 inch from the bottom tip of the bait material. The bottom hole is centered approximately 1/4 inch from the bottom tip of the bait material. The material may be made from artificial or fresh materials such as foam, plastic, rubber, skins or rinds or any pliable material suitable for the design. The entire design can be made with one die cut as shown in FIG. 1 of the drawings in any size. The polyethylene foam chosen for this example can be found At many of the foam manufacturers such as Fibre-Craft Material Corp. in Nile, Ill.

The side view of FIG. 2 shows the flatness of the bait material of REF. NUMERAL 1. This view also shows top hole REF. NUMERAL 3 and bottom hole REF. NUMERAL 4 extending through the bait material from front to back.

FIG. 3 shows a fish hook REF. NUMERAL 7 being inserted into the hook spinning bait material. The fish hook chosen for this example is a size 01. The shank being approximately 1/6 shorter than the length of the bait material design. The hook should be slightly shorter than the bait material. The arrow REF. NUMERAL 12 shows the direction the hook's eye REF. NUMERAL 11 is inserted into the top hole REF. NUMERAL 3 of FIG. 3 at the front of the bait material. The shank of the hook REF. NUMERAL 10 is then pushed down the back side of the bait material and eye of the hook is pushed back through the bottom hole REF. NUMERAL 4, to the front of the bait material continuing in a downward direction as shown by the arrow of REF. 13 stopping just below the tip of the bait material and is not permanently attached to the bait material allowing the hook to be easily attached or removed from the bait material. The bend of the hook REF. NUMERAL 9 and the barbed tip of the hook REF. NUMERAL 8 are facing outward away from the bait material REF. NUMERAL 1 of FIG. 3.

FIG. 4 shows the attachment of the barbed tip of the fish hook REF. NUMERAL 8 to the top left quarter portion REF. NUMERAL 5 where in the top left quarter portion is bent forward underneath the barbed tip of the hook and pulled up into the barbed tip of the hook REF. NUMERAL 8 allowing the barbed tip of the hook to pierce the top portion of the top left quarter portion of the bait material, holding the top left quarter portion of the bait material forward. The perspective view of FIG.4 shows a portion of the shank of the hook REF. NUMERAL 10 running through the top hole REF. NUMERAL 3 down the back of the bait material back through the bottom hole REF. NUMERAL 4. The top right quarter portion of the bait material REF. NUMERAL 6 of FIG. 4 is pushed backwards behind by the top portion of the hook shank REF. NUMERAL 10. The top left quarter portion of the hook spinning bait material is held in place in a forward position and the top right quarter portion is held in a backward position on the hook leaving in place a propeller type shape on the fish hook as seen in the side view angle of the assembled hook spinning bait of FIG. 5.

Figure 5:
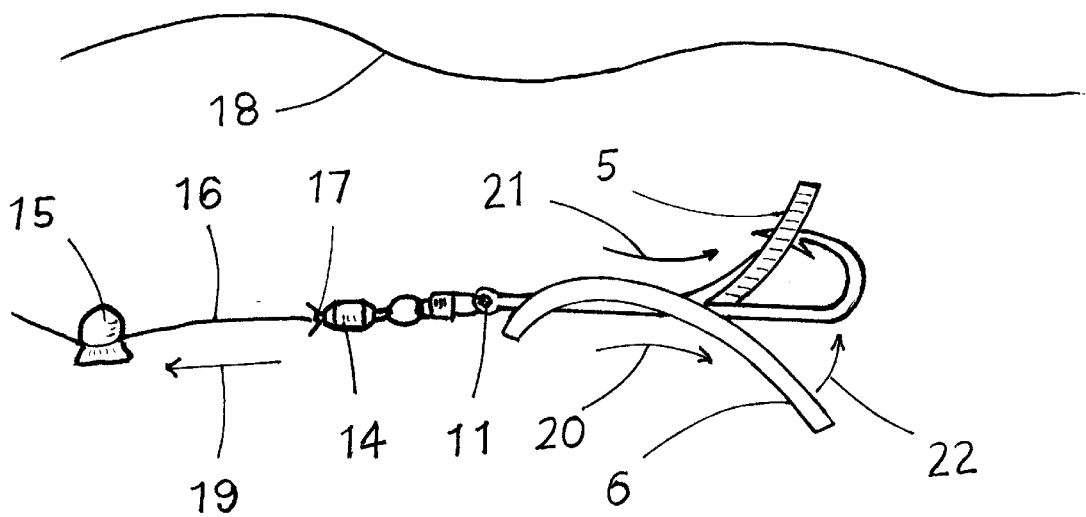
FIG. 5 illustrates the hook spinning bait being pulled beneath the surface of the water on a fishing line toward the fisherman showing the swivel attachment of the hook to the weighted fishing line. The side view of the baited fish hook shows the propeller like shape of the baited fish hook and the directional spin of the hook with the bait material caused by the directional pressure of the water against the hook spinning bait material when pulled through the water.

The hook spinning bait is now ready to attach to a fisherman's fishing line. FIG. 5 shows the assembled hook spinning bait being pulled below the water surface REF. NUMERAL 18 on the fisherman's fishing line REF.

NUMERAL 16. The eye of the fish hook REF. NUMERAL 11 of FIG. 5 is attached to a swivel assembly REF. NUMERAL 14 that is tied to the fishing line with a knot REF. NUMERAL 17. A weight REF. NUMERAL 15 of ⅛ oz. is attached to the fishing line to hold the hook spinning bait below the water surface. The arrow of REF. NUMERAL 19 of FIG. 5 shows the directional movement of the fishing line to the fisherman. The movement of the fishing line toward the fisherman causes the directional pressure of the water, shown by the arrow of REF. NUMERAL 21, against the front of the top left quarter portion REF. NUMERAL 5 of the bait material of FIG. 5 also showing the directional pressure of the water, shown by the arrow of REF. NUMERAL 20, against the back of the top right quarter portion REF. NUMERAL 6 of the bait material, causing the propeller shaped hook spinning bait of FIG. 5 to spin the hook in the direction of the arrow of REF. NUMERAL 22, from right to left. The hook spinning fishing bait will spin the fish hook through the directional movement of the fishing line. When the fishing line stops the hook spinning bait will follow the sinking direction of the weighted fishing line spinning until the line hits bottom wherein the bait will rest on the bottom with the hook or float just above the weight when made of polyethylene foam as in this example. The hook will spin as long as the movement of the fishing line continues either in a horizontal retrieval or vertical fall and retrieve.

Hooks, swivels and weights may be found in the many local department stores that sell fishing supplies. Different size weights and hooks may be used at the fisherman's discretion. Many size and style hooks may be used.

What is claimed is:

1. A hook spinning fishing bait of a pliable tear-drop shaped planar material having a wide top portion, a narrow, pointed bottom portion, a front flat side, a back flat side, a vertical cut extending from the top of said tear drop shaped planar material along the center line of said planar material adjacent to and extending through said planar material from front to back stopping at a point one half the vertical length of said planar material in the mid portion of said tear-drop shaped planar material and a small hole adjacent to and extending through said planar material from the front side to the back side slightly right of the bottom of said vertical cut, and a second hole adjacent to and extending through said planar material from front side to the back side centered in the bottom portion of said tear-drop shaped planar material and means for attaching to a fish hook providing a continuous right to left spinning motion of said tear-drop planar material with said hook when pulled through the water on a fishing line whereby said means for attaching to a fish hook is said small hole slightly right of the bottom of said vertical cut in said planar material and said second hole centered in the bottom tip portion of said tear-drop shaped planar material allows the shank of said hook to be inserted through said holes from top to bottom leaving the barbed tip of said hook facing forward, said vertical cut forming two top quarter portions allows the top left quarter portion to bend forward and be pulled upward under the barbed tip of said hook slightly piercing the tip of said top left quarter portion the shank of said hook pushing the top right quarter portion back forming a propeller like shape on said hook top quarter portions extending out into the water one forward one backward causing said hook to spin when the pressure of the water against said propeller shaped planar material forces said propeller shaped material to spin right to left with said hook in a continuous circular motion when pulled through the water churning the water substantially to attract more fish.

* * * * *